Sept. 12, 1967        W. WINGER        3,340,798
MOLD FOR FOOD PRODUCTS
Filed Jan. 28, 1965        2 Sheets-Sheet 2
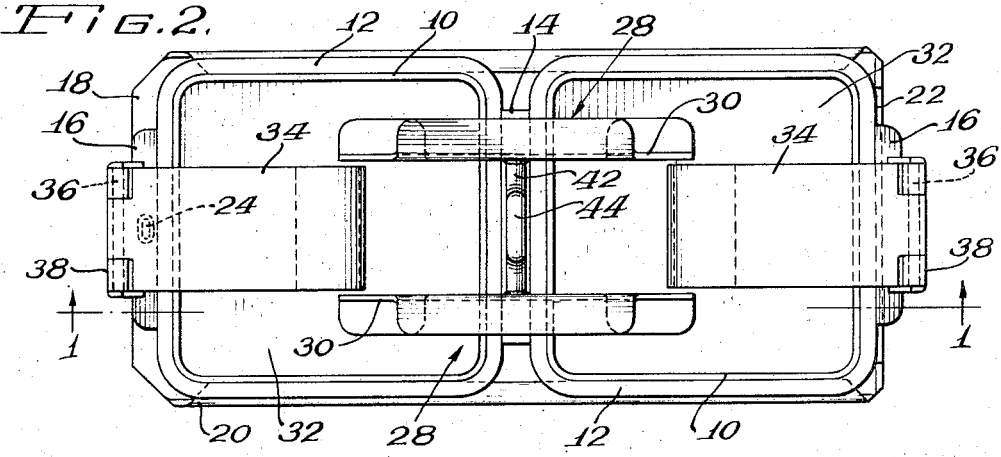
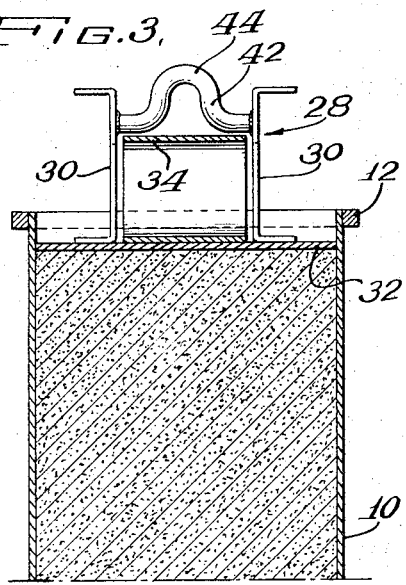
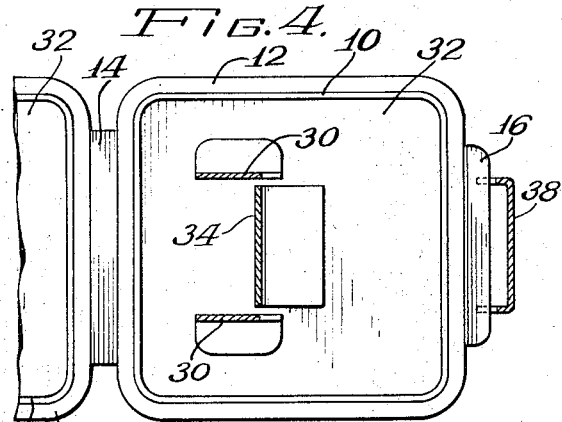
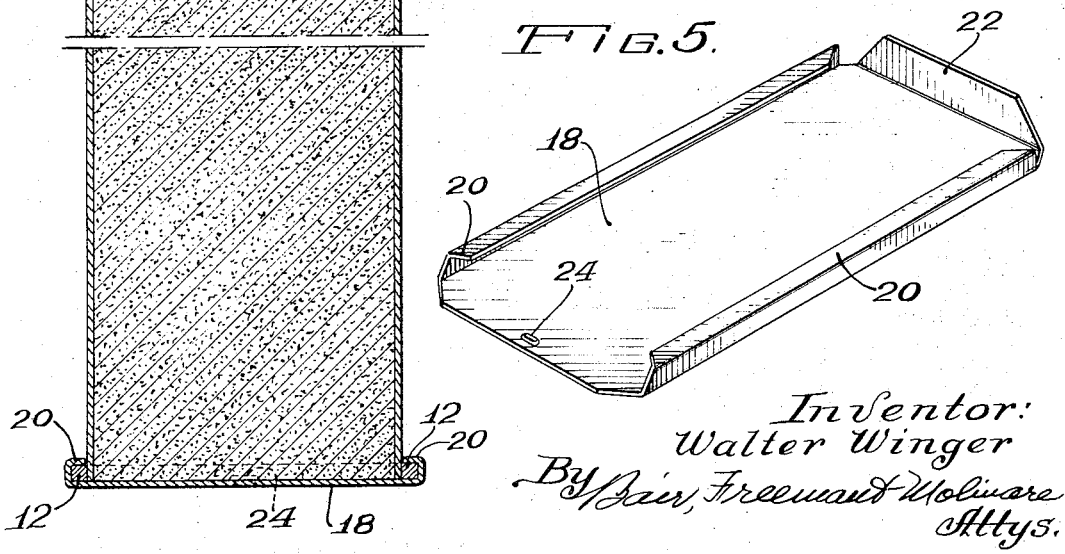
Inventor:
Walter Winger
By Bair, Freeman & Molinare
Attys.

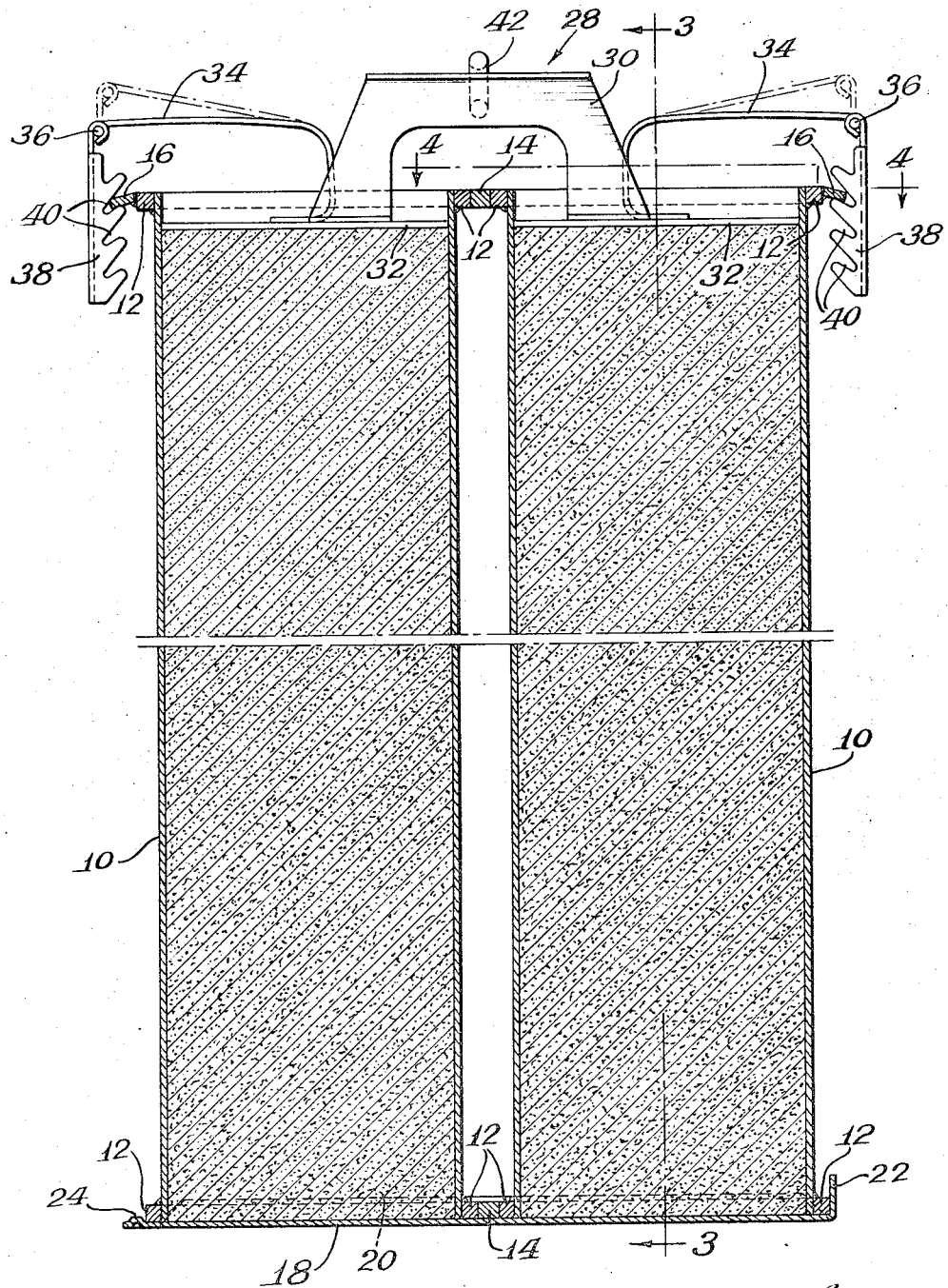

3,340,798
MOLD FOR FOOD PRODUCTS
Walter Winger, Ottumwa, Iowa, assignor to The Cincinnati Butchers' Supply Company, Cincinnati, Ohio, a corporation of Ohio
Filed Jan. 28, 1965, Ser. No. 429,210
5 Claims. (Cl. 100—219)

This invention relates to molds for forming food products such as forming and compressing ham and other meats into loaf form.

Molds for such purposes have been and are currently extensively used by meat processors. Such molds have not, however, been found totally satisfactory for various reasons. One of the objections is that such molds are not constructed and arranged for convenient handling by mechanical equipment. Another and very critical objection to the use of currently available molds is the result of difficulties experienced in attempting to properly cleanse the components thereof after use in an endeavor to obtain an acceptable degree of sanitation. It is desired to preclude contamination of meat being processed by meat particles and other meat residue being retained from a previous use on certain portions of the components, even after strenuous attempts are made to perform a thorough cleansing operation thereon. When such meat particles and meat residue is not completely removed from meat contacting surfaces during the cleansing operations, it results in bacterial growth and contamination being imparted to meat subsequently processed in the use of such components. In molds of the type disclosed in United States Patents Nos. 2,726,024 and 3,017,822, which have been extensively used commercially, it will be noted that the entire interior surface of the mold is not uninterrupted from end to end, and it will be observed that the lower end of each mold body is formed with an inwardly extending flange portion which is a part of a base plate, and which is an integral part of the mold body. This inwardly extending flange serves to support an additional removable bottom closure plate. The angular juncture or corner formed in the zone of connection of said flange with the interior surface of the body proper of the mold, entraps meat particles and meat residue which cannot practically nor completely and totally removed incident to the usual cleansing operations performed upon the mold components, and hence results in the foregoing highly objectionable unsanitary conditions.

One of the objects of this invention is to provide an improved meat mold construction of the character indicated in which the mold body is provided with a smooth, uninterrupted internal surface, and havin a uniform opening from end to end and by virtue of which certain of the foregoing difficulties and disadvantages of presently used molds are obviated.

Another object of this invention is to provide a meat mold construction of the character indicated which is composed of few components and which may be quickly, easily and properly cleansed so as to insure obtaining a proper degree of sanitation for subsequent use of the mold.

A further object is to provide a novel meat mold of the character indicated which is constructed and arranged so that the finished meat loaf produced thereby may be quickly and easily discharged out of either end of the mold.

Still another object of this invention is to provide an improved meat mold of the character indicated which is simple and rugged in construction, economical to manufacture, and which is convenient and practical in assembly and disassembly of its separate components.

Other objects and advantages of this invention will be apparent from the following description, taken in connection with the accompanying drawings, in which:

FIG. 1 is a vertical sectional view through a dual type mold assembly embodying the present invention, taken substantially as indicated at line 1—1 on FIG. 2.

FIG. 2 is a top plan view of the mold assembly disclosed in FIG. 1 of the drawings.

FIG. 3 is a transverse, vertical sectional view through a portion of the mold, taken substantially as indicated at line 3—3 on FIG. 1.

FIG. 4 is a fragmentary sectional view, taken substantially as indicated at line 4—4 on FIG. 1.

FIG. 5 is a perspective view of a closure plate for one end of the dual mold as represented in FIG. 1.

While I have herein shown the present invention as applied to a dual type of mold, it will be manifest that various of its constructional features are equally applicable to a single cavity mold. Molds of this general type are composed of several separate components which are interconnected in use, and because of the nature of use of such molds, that is in the meat processing industry, it is highly desirable that all components thereof be formed on noncorrosive material, such as stainless steel.

As shown in the drawings, the dual mold assembly comprises a pair of identical tubular metal bodies 10 of rectangular cross-section. The bodies are open at both ends and each have a smooth uninterrupted internal surface and a uniform opening from end to end. At each end of the tubular bodies there is provided a rod 12, of rectangular cross-section, which completely surrounds the body and is continuously welded thereto around the entire periphery of the body. These rods are so positioned with respect to the ends of the bodies that one face of the rod is flush with the adjacent rod face of the body. These rods in effect form flanges for opposite ends of each of the bodies and in addition to reinforcing the end portions of the bodies, insures against deformation and damage to the terminal end portions of said bodies. As shown in the drawings, the two bodies are positioned side-by-side, in spaced apart, parallel relation. The portions of the rod opposite each other on the respective bodies, at upper and lower ends, are secured together and as shown are welded to a spacer or filler bar 14.

Welded to the rods 12, at the upper ends of the body, at the ends of the mold assembly, that is at the sides opposite to the spacer bar 14, are laterally extending latching lips 16. Preferably, the connections of the latching lips and the spacer bars to the rods 12 are in the nature of Heliarc welds so as to dispense with any metallic deposits incident to welding, and to insure providing a smooth continuous surface.

The bottoms of the mold bodies of the dual mold assembly may be closed by a single closure plate element 18, which is of generally elongated form. Said plate has opposite marginal edges bent as indicated at 20, to form guideways or channels so as to permit the closure element to be placed in operative position with the bent portions thereof telescoped around the side and top portions of the rods 12, at the bottom of said bodies 10, as seen in FIG. 3 of the drawings. The guideways formed by the bent portions of the closure element are so dimensioned as to insure snug embracement of the rods 12 to assist in retaining the plate in operative position. One end of the closure element is formed with an upwardly extending flange 22, adapted to abut against a portion of the rod, on one of the bodies as seen in FIG. 1 of the drawings, and the opposite end of the closure element is formed with an upwardly embossed nubbin or keeper 24 which is so located that when the closure element is in operative position, the keeper extends immediately beyond the rod 12 at the opposite end of the dual mold assembly, as seen in FIG. 1 of the drawings for further aiding to maintain the closure element in operative position. By virtue of this construction, the closure element 18 is thus maintained in firm contacting engagement with the end faces of the two bodies 10 of the mold assembly.

It will be apparent that the closure element 18 may be quickly and easily placed into operative relation to the two tubular bodies or removed therefrom. It will also be apparent that if desired, a similar closure element may be utilized at the upper end of the two mold bodies, depending on the nature of use of the molds. When the closure element 18 is connected to the bottom of the mold bodies it is then ready for use.

After the mold bodies are stuffed and the meat firmed or compressed therein, prior to the cooking of the meat, while still in the mold, a closure and pressure plate assembly, indicated generally at 28, is mounted on the upper end of the dual mold assembly. The closure and pressure plate assembly comprises a pair of elongated, upright, spaced apart, side frame members 30, the lower ends of which are flanged and welded to a pair of separate closure plate elements 32 which are dimensioned for a snug telescopic fit into the upper ends of the respective mold bodies 10. An elongated leaf spring means is provided to exert resilient pressure by the plate elements 32 on the meat in the wall bodies, and as shown, comprises two separate leaf spring members 34, each having one end portion bent and welded to the top of a respective closure plate element 32. Said leaf spring members also include a main body portion, spaced above the closure plate elements 32, with the outer free ends thereof terminating laterally and above the latching lips 16. Pivotally connected, as indicated at 36, to the outer free ends of said leaf springs 34, are depending latching arms 38, each of which is formed with a plurality of upwardly inclined notches 40, adapted for selective engagement with the outer edge portion of the adjacent latching lip 16.

When the closure pressure plate assembly is placed in operative position, a desired amount of pressure is applied through the closure plate elements 32 to the body of meat within the tubular bodies 10, and the springs 34 are then pressed downwardly to a desired position in order that aligned notches 40 of the latching arms 38 are caused to be cooperatively engaged with the latching lips 16 for securely attaching the closure pressure plate assembly to the dual mold assembly.

Interconnecting the upper portions of the side frame members 30, intermediate their length, is a hanger rod 42, the ends of which are welded to the inner surfaces of said frame members and the intermediate portion of said rod is bent upwardly to form a hanger loop 44. The hanger rod in addition to reinforcing the frame members also serves as a hanger loop to facilitate manual or mechanical handling of the dual mold unit.

It is to be noted that the improved mold constructure herein disclosed is composed of three separate components, and the closure components for either the bottom or top of the mold unit may be quickly and easily placed into or removed from operative position. All of the components of the total assembly lend themselves for proper and efficient cleansing for reuse and insures against possible contamination of meat introduced into the mold bodies by reason of any meat particles or meat residue that might remain upon portions of the mold bodies from a previous usage thereof. It will also be observed that the construction is such that the meat loaves when cooked may be removed by discharging from either end of the mold bodies.

It will also be observed that many of the novel construction features of the present invention are applicable for use in connection with single mold body. It will also be apparent that various changes in construction may be made without departing from the spirit and scope of this invention. I do not, therefore, wish to be understood as limiting this invention to the precise embodiments herein disclosed, except as I may be so limited by the appended claims.

I claim:

1. A dual meat mold comprising a pair of identical tubular, metal bodies of rectangular cross-section positioned in close side by side aligned relation, each body being open at both ends and having a smooth uninterrupted, internal surface and uniform opening from end to end, each end of each body being provided with a metal rod of rectangular cross section welded to and surrounding the exterior surface of the body and positioned flush with the end of the body, the adjacent portions of said rods of the two bodies, at their respective ends being rigidly interconnected so that the end surfaces of said rods and bodies, at each end, are positioned in a common plane, and an elongated bottom closure plate having a pair of opposite marginal edge portions bent to provide guideways for telescoping over corresponding aligned, opposite side portions of said rods on the lower ends of the two bodies for securing the closure plate in firm contact with the bottom ends of said two bodies.

2. A dual meat mold comprising a pair of identical tubular, metal bodies of rectangular cross-section positioned in close side by side aligned relation, each body being open at both ends and having a smooth uninterrupted, internal surface and uniform opening from end to end, each end of each body being provided with a metal rod of rectangular cross section welded to and surrounding the exterior surface of the body and positioned flush with the end of the body, the adjacent portions of said rods of the two bodies, at their respective ends being rigidly interconnected so that the end surfaces of said rods and bodies, at each end, are positioned in a common plane, and an elongated bottom closure plate having a pair of opposite marginal edge portions bent to provide guideways for telescoping over corresponding aligned, opposite side portions of said rods on the lower ends of the two bodies for securing the closure plate in firm contact with the bottom ends of said two bodies, one end of said plate being formed with an upwardly extending portion for abutting against a portion of the rod on one body when the closure is in operative position on said bodies, and the other end of said plate having an upwardly extending keeper, adapted when the closure plate is in operative position to be located beyond the opposite corresponding portion of the rod on the other body to assist in maintaining the closure in operative position.

3. A dual meat mold comprising a pair of identical tubular, metal bodies of rectangular cross-section positioned in close side by side aligned relation, each body being open at both ends and having a smooth uninterrupted, internal surface and uniform opening from end to end, each end of each body being provided with a metal rod of rectangular cross section welded to and surrounding the exterior surface of the body and positioned flush with the end of the body, the adjacent portions of said rods of the two bodies, at their respective ends being rigidly interconnected so that the end surfaces of said rods and bodies, at each end, are positioned in a common plane, an elongated bottom closure plate having a pair of opposite marginal edge portions bent to provide guideways for telescoping over corresponding aligned, opposite side portions of said rods on the lower ends of the two bodies for securing the closure plate in firm contact with the bottom ends of said two bodies, the outermost end rod portions at the upper end of the assembly of the two bodies each having an outwardly extending latching lip, and a closure-pressure plate assembly for the upper ends of said bodies, comprising a pair of elongated, upright, spaced, side frame members, a pair of separate closure plate elements secured respectively to opposite end portions of said frame members, and dimensioned for snug telescopic fit into the upper ends of said two bodies, elongated leaf spring means connected to the frame members and having outer end portions, when the closure assembly is in operative position, extending laterally and above said latching lips, and a pair of depending latching arms pivotally connected respectively to the outer end portions of said spring means, each of said arms having a plurality of notches for selective cooperative engagement with the respective latching lips on said bodies.

4. A dual meat mold comprising a pair of identical tubular, metal bodies of rectangular cross-section positioned in close side by side aligned relation, each body being open at both ends and having a smooth uninterrupted, internal surface and uniform opening from end to end, each end of each body being provided with a metal rod of rectangular cross section welded to and surrounding the exterior surface of the body and positioned flush with the end of the body, the adjacent portions of said rods of the two bodies, at their respective ends being rigidly interconnected so that the end surfaces of said rods and bodies, at each end, are positioned in a common plane, an elongated bottom closure plate having a pair of opposite marginal edge portions bent to provide guideways for telescoping over corresponding aligned, opposite side portions of said rods on the lower ends of the two bodies for securing the closure plate in firm contact with the bottom ends of said two bodies, a closure assembly for and detachably connected to the upper ends of said bodies and having a pair of elongated, upright, spaced side frame members, and a hanger rod interconnecting said side frame members intermediate their length.

5. A meat mold comprising a tubular, metal body of rectangular cross-section, said body being open at both ends and having a smooth uninterrupted, internal surface and uniform opening from end to end, each end of the body being provided with a metal rod welded to and surrounding the exterior surface of the body and positioned flush with the end of the body, a bottom closure plate having a pair of opposite marginal edge portions bent to provide guideways for telescoping over opposite side portions of said rods on the lower end of the body for securing the closure plate in firm contact with the bottom end of said body, one end of the closure plate having an upturned portion for abutting the rod when the closure plate is in operative position, and the other end of said plate having an upwardly extending keeper, adapted when the plate is in operative position to be located immediately beyond the opposite portion of the rod to assist in maintaining the plate in operative position.

References Cited
UNITED STATES PATENTS

| | | | |
|---|---|---|---|
| 994,832 | 6/1911 | Hall | 249—168 |
| 1,346,076 | 7/1920 | Bollinger | 249—121 |
| 1,840,561 | 1/1932 | Bremiller | 220—41 |
| 2,585,526 | 2/1952 | Zautner | 220—41 X |
| 2,597,592 | 5/1952 | Minder | 17—32 X |
| 2,746,402 | 5/1956 | Baxter | 249—160 X |
| 3,166,007 | 1/1965 | Hawley et al. | 100—219 |

FOREIGN PATENTS

| | | |
|---|---|---|
| 219,628 | 7/1924 | Great Britain. |

J. SPENCER OVERHOLSER, *Primary Examiner.*

E. MAR, *Assistant Examiner.*